United States Patent

Long

(10) Patent No.: US 9,990,778 B2
(45) Date of Patent: Jun. 5, 2018

(54) NOTIFICATION SYSTEM FOR VIRTUAL REALITY DEVICES

(71) Applicant: TYCO SAFETY PRODUCTS CANADA LTD., Concord (CA)

(72) Inventor: Jason L. Long, Courtice (CA)

(73) Assignee: TYCO SAFETY PRODUCTS CANADA LTD., Ontario (CA)

(*) Notice: Subject to any disclaimer, the term of this patent is extended or adjusted under 35 U.S.C. 154(b) by 0 days. days.

(21) Appl. No.: 15/235,451

(22) Filed: Aug. 12, 2016

(65) Prior Publication Data

US 2018/0047212 A1 Feb. 15, 2018

(51) Int. Cl.
*G06T 19/00* (2011.01)
*H04L 12/58* (2006.01)
*G09G 5/00* (2006.01)

(52) U.S. Cl.
CPC ........... *G06T 19/006* (2013.01); *G09G 5/003* (2013.01); *H04L 51/24* (2013.01); *G09G 2370/16* (2013.01)

(58) Field of Classification Search
None
See application file for complete search history.

(56) References Cited

U.S. PATENT DOCUMENTS

| 9,113,051 | B1* | 8/2015 | Scalisi | H04N 7/185 |
|---|---|---|---|---|
| 2008/0129821 | A1 | 6/2008 | Howarter et al. | |
| 2013/0293688 | A1* | 11/2013 | Benson | G02B 27/017 348/53 |
| 2015/0029335 | A1 | 1/2015 | Kasmir et al. | |
| 2015/0161882 | A1 | 6/2015 | Lett | |
| 2016/0335808 | A1* | 11/2016 | Novak | G06T 19/006 |
| 2017/0048495 | A1* | 2/2017 | Scalisi | H04L 12/2818 |

OTHER PUBLICATIONS

European Search Report dated Jan. 2, 2018 for corresponding EPO Application No. 17185903.6.

* cited by examiner

*Primary Examiner* — Ryan M Gray

(57) ABSTRACT

A notification system for virtual reality devices that includes a message indicator device, an audiovisual (A/V) signal source connected to the message indicator device and adapted provide an A/V feed containing at least one of video information and audio information, a monitoring system connected to the message indicator device and configured to detect notification events at a monitored premises, and a virtual reality (VR) headset connected to the message indicator device and adapted to receive and present the A/V feed, wherein the message indicator device is adapted to communicate the A/V feed to the VR headset during a normal operating state, and wherein the message indicator device is adapted to communicate an alert signal to the VR headset upon detection of a notification event by the monitoring system.

18 Claims, 5 Drawing Sheets

NOTIFICATION SYSTEM FOR VIRTUAL REALITY DEVICES

FIELD OF THE DISCLOSURE

The disclosure relates generally to the field of life safety systems, and more particularly to a system and method for providing alarm and message notifications to users of virtual reality devices.

BACKGROUND OF THE DISCLOSURE

Recent advances in audiovisual (A/V) technologies have led to the development of small, affordable devices and systems that are able to provide users with fully immersive entertainment experiences. Examples of such devices and systems include virtual reality (VR) headsets. A typical VR headset includes an integrated display, headphones, and position tracking components that are worn on a user's head and that are configured to occlude the sights and sounds of a user's real-world environment while immersing the user in an A/V feed supplied by an A/V signal source (e.g., a gaming console, a personal computer, a Blu-ray player, etc.).

The immersive nature of VR headsets presents a unique problem in the context of life safety systems that are designed to alert occupants of a premises (e.g., a residence) of various hazardous conditions such as fire, carbon monoxide, intrusion, etc. Particularly, since a VR headset eliminates or reduces a user's ability to perceive his or her real-world environment, the user may not see or hear the output of notification devices (e.g., sirens, horns, buzzers, strobes, etc.) that are normally triggered when a life safety system detects a hazardous condition. Thus, the efficacy of the life system is reduced and the VR headset user's safety is jeopardized. This danger is exacerbated if the user is at home alone with no other occupants to alert the user upon the occurrence of a hazardous event.

A VR headset may also eliminate or reduce a user's awareness of various non-hazardous events, such as incoming telephone calls, a ringing door bell, the opening and closing of doors and windows, etc. While these types of events may not pose a danger to the safety or well-being of a residential occupant, a VR headset user's inability to perceive such events may create an inconvenience. For example, if a residential occupant is expecting a delivery or a service call on a particular day, he or she may have to forgo use of a VR headset for an extended period of time to ensure that a delivery or service call is not missed.

In view of the foregoing, it would be advantageous to provide a system and method for allowing a residential occupant to conveniently receive notifications relating to events occurring within the occupant's real-world, residential environment while the occupant is using a VR headset.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of a message indicator device in accordance with an embodiment of the present disclosure may include a processor adapted to communicate an audio-visual (A/V) feed from an A/V signal source to a virtual reality (VR) headset during a normal operating state, and further adapted to communicate an alert signal to the VR headset upon receiving a notification signal from a monitoring system indicating an occurrence of a notification event.

An exemplary embodiment of a notification system for virtual reality devices in accordance with the present disclosure may include a message indicator device, an A/V signal source connected to the message indicator device and adapted provide an A/V feed containing at least one of video information and audio information, a monitoring system connected to the message indicator device and configured to detect notification events at a monitored premises, and a VR headset connected to the message indicator device and adapted to receive and present the A/V feed, wherein the message indicator device is adapted to communicate the A/V feed to the VR headset during a normal operating state, and wherein the message indicator device is adapted to communicate an alert signal to the VR headset upon detection of a notification event by the monitoring system.

An exemplary embodiment of a notification method in accordance with the present disclosure may include an A/V signal source sending an A/V feed containing at least one of video information and audio information to a VR headset via a message indicator device that is connected to the A/V signal source and to the VR headset, the VR headset presenting the A/V feed to a user via at least one of a display and headphones of the VR headset, the message indicator device receiving a notification signal indicating the occurrence of a notification event from a monitoring system, and the message indicator device communicating an alert signal to the VR headset upon receiving the notification signal, whereby the VR headset presents a notification of the notification event to the user.

DETAILED DESCRIPTION

Figure 1:
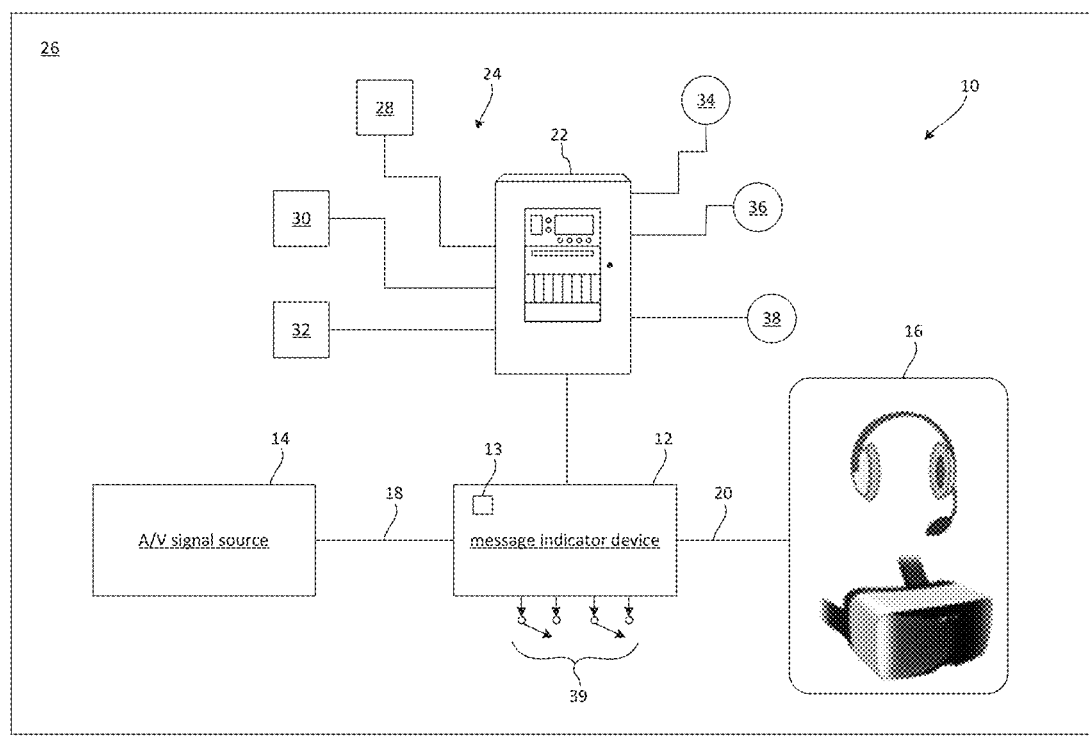
FIG. 1 is a schematic diagram illustrating an exemplary embodiment of a notification system in accordance with the present disclosure.

In accordance with the present disclosure, a system and method for allowing a VR headset user to receive notifications relating to events occurring in the user's real-world environment will now be described more fully hereinafter with reference to the accompanying drawings. The system and method may be embodied in many different forms and should not be construed as being limited to the embodiments set forth herein. Rather, these embodiments are provided so that this disclosure will be thorough and complete, and will fully convey the scope of the system and method to those skilled in the art. In the drawings, like numbers refer to like elements throughout unless otherwise noted.

Referring to FIG. 1, a schematic diagram of a notification system for virtual reality devices (hereinafter "the system 10") in accordance with an embodiment of the present disclosure is shown. The system 10 may include a message indicator device 12 and an associated processor 13 that may be operatively connected to an A/V signal source 14 and to a VR headset 16 via respective data connections 18, 20. The A/V signal source may be any conventional electronic device that is capable of playing or streaming A/V media such as television programs, movies, music, video games, etc. Such devices may include, but are not limited to, gaming consoles, personal computers, smartphones, cable or satellite set tops, Blu-ray players, digital cameras, and the like. The VR headset 16 may be any type of commercially available virtual reality headset, including, but not limited to, the OCULUS RIFT, the HTC VIVE, the PLAYSTATION VR, the SULON Q, the SAMSUNG GEAR VR, the LG 360 VR, and the like, and may include a display 19, headphones 21, and position tracking components (not shown). The data connections 18, 20 that connect the message indicator device 12 to the A/V signal source 14 and to the VR headset 16 may be any variety of conventional or proprietary wired A/V connectors that would conventionally be used to connect the A/V signal source 14 directly to the VR headset 16. Such connectors may include, but are not limited to, coaxial, optical, HDMI, RCA, DVI, Ethernet, Mini-DIN, FIREWIRE, etc. Additionally, or alternatively, the data connections 18, 20 may be facilitated by any variety of conventional, wireless data connection types, including, but not limited to, Wi-Fi and Bluetooth.

The message indicator device 12 may also be connected to a control panel 22 of a monitoring system 24 via any variety of wired and/or wireless communication means, including, but not limited to, Ethernet, WiFi, Bluetooth, and/or cellular communication using various mobile communications standards (e.g., 3G, 4G, etc.). The monitoring system 24 may be any type of system that is configured to detect the occurrence of specific events or conditions within a premises or residence 26 in which the message indicator device 12, the A/V signal source 14, and the VR headset 16 are located. In one non-limiting example, the monitoring system 24 may be, or may include, a residential life safety system that is configured to detect the occurrence of various hazardous conditions or events in the residence 26, such events or conditions including, but not limited to, fire, high heat, carbon monoxide, intrusion (e.g., forced entry through doors/windows), manual activation of a panic alarm by a resident, and manual activation of a medical alarm by a resident. The monitoring system 24 may additionally or alternatively include various so-called "smart home" or "intelligent home" features that facilitate the detection of certain non-hazardous events or conditions in the residence 26, such events or conditions including, but not limited to, the actuation of a doorbell, incoming telephone calls, and the opening and closing of doors and windows. All of the above-listed hazardous and non-hazardous events and conditions are hereinafter referred to collectively as "notification events."

In the exemplary embodiment illustrated in FIG. 1, the monitoring system 24 may include a plurality of sensors 28, 30, 32 that may be distributed throughout the residence 26 and that may be operatively connected to the control panel 22. The sensors 28, 30, 32 may include, but are not limited to, contact sensors, motion sensors, vibration sensors, noise sensors, proximity sensors, cameras, temperature sensors, smoke detectors, carbon monoxide detectors, etc. The sensors 28, 30, 32 may be configured to detect various notification events and to transmit electrical signals indicative of such notification events to the control panel 22. The three sensors 28, 30, 32 are depicted by way of example only, and it will be understood that the monitoring system 24 may include a greater or fewer number of sensors without departing from the present disclosure. Similarly, it will be understood that the monitoring system 24 may include more control panels than the single control panel 22 shown.

Upon identifying a notification event via one or more of the sensors 28, 30, 32, the control panel 22 may generate output (e.g., alarm noises, verbal messages, visual displays, etc.) via various notification devices 34, 36, 38 that may be distributed throughout the residence 26 for notifying occupants of the residence 26 of the detected notification event. The notification devices 34, 36, 38 may include, but are not limited to, speakers and display screens that may or may not be integral to the control panel 22. Additionally, or alternatively, the control panel 22 may communicate, via a wired or wireless communication path 22, an indication of the detected notification event to a remotely-located central monitoring station (not shown) that may be responsible for maintaining and overseeing the monitoring system 24. The central monitoring station may subsequently issue personnel to the residence 26 or may contact police, fire, or other appropriate entities to address the detected notification event if such action is warranted.

The message indicator device 12 may further include one or more universal "zone" type inputs 39 that are similar to those commonly found on conventional security panels as will be familiar to those of ordinary skill in the art. The zone type inputs 39 may facilitate the connection of various additional sensors, monitoring devices, and manually or automatically actuated input devices (not shown) directly to the message indicator device 12 for detecting and communicating additional notification events (i.e., in addition to notification events that are monitored and communicated by the monitoring system 24) to the message indicator device 12. For example, if the monitoring system 24 is only equipped to detect hazardous notification events (fire, carbon monoxide, intrusion, etc.) but does not include "smart home" features for detecting non-hazardous notification events (e.g., doorbell actuation, incoming phone calls, etc.) a user of the system 10 may elect to install a third-party or peripheral smart home system in the residence 26 and may connect the smart home system to the zone type inputs 39 so that notification events detected by the smart home system are communicated to the message indicator device 12. The zone type inputs 39 may be prioritized such that a first of the zone type inputs 39 is designated to register a hazardous notification when actuated by an input device connected thereto and wherein a second of the zone type inputs 39 is designated to register a non-hazardous notification when actuated by an input device connected thereto. While only two zone type inputs 39 are depicted in FIG. 1, it is contemplated that a fewer or greater number of two zone type inputs 39 may be implemented without departing from the present disclosure.

While the message indicator device 12 and its associated processor 13 are shown as being separate from the other components of the system 10, various alternative embodiments of the system 10 are contemplated in which the message indicator device 12 may be integrated into one or more of the A/V signal source 14, VR headset 16, and control panel 22.

In the absence of a notification event occurring at the residence 26 (i.e., during normal operation of the system 10, referred to herein as a "normal operating condition"), the processor of the message indicator device 12 may be configured to allow an occupant of the residence 26 to use the VR headset 16 in a normal, uninterrupted manner, whereby the VR headset may occlude the sights and sounds of the occupant's real world environment (i.e., the residence 26) while immersing the occupant in the sights and sounds of an A/V feed supplied to the VR headset 16 by the A/V signal source 14. The message indicator device 12 may thus operate as a simple pass-through device for conveying the A/V feed from the A/V signal source 14 to the VR headset 16.

Upon the detection of a notification event by the monitoring system 24, the control panel 22 may, in addition to actuating the notification devices 34, 36, 38 and/or contacting a central monitoring station as described above, transmit a notification signal to the message indicator device 12, wherein such notification signal may include information relating to the detected notification event. A notification signal may additionally or alternatively be registered by the message indicator device 12 upon actuation of one of the zone type inputs 39 (described above). Upon receiving a notification signal, the processor 13 of the message indicator device 12 may be configured to interrupt or supplement the A/V feed supplied by the A/V signal source 14 to the VR headset 16 in order to alert the occupant using the VR headset 16 to the detected notification event. This functionality is described in greater detail below.

Figure 2A:
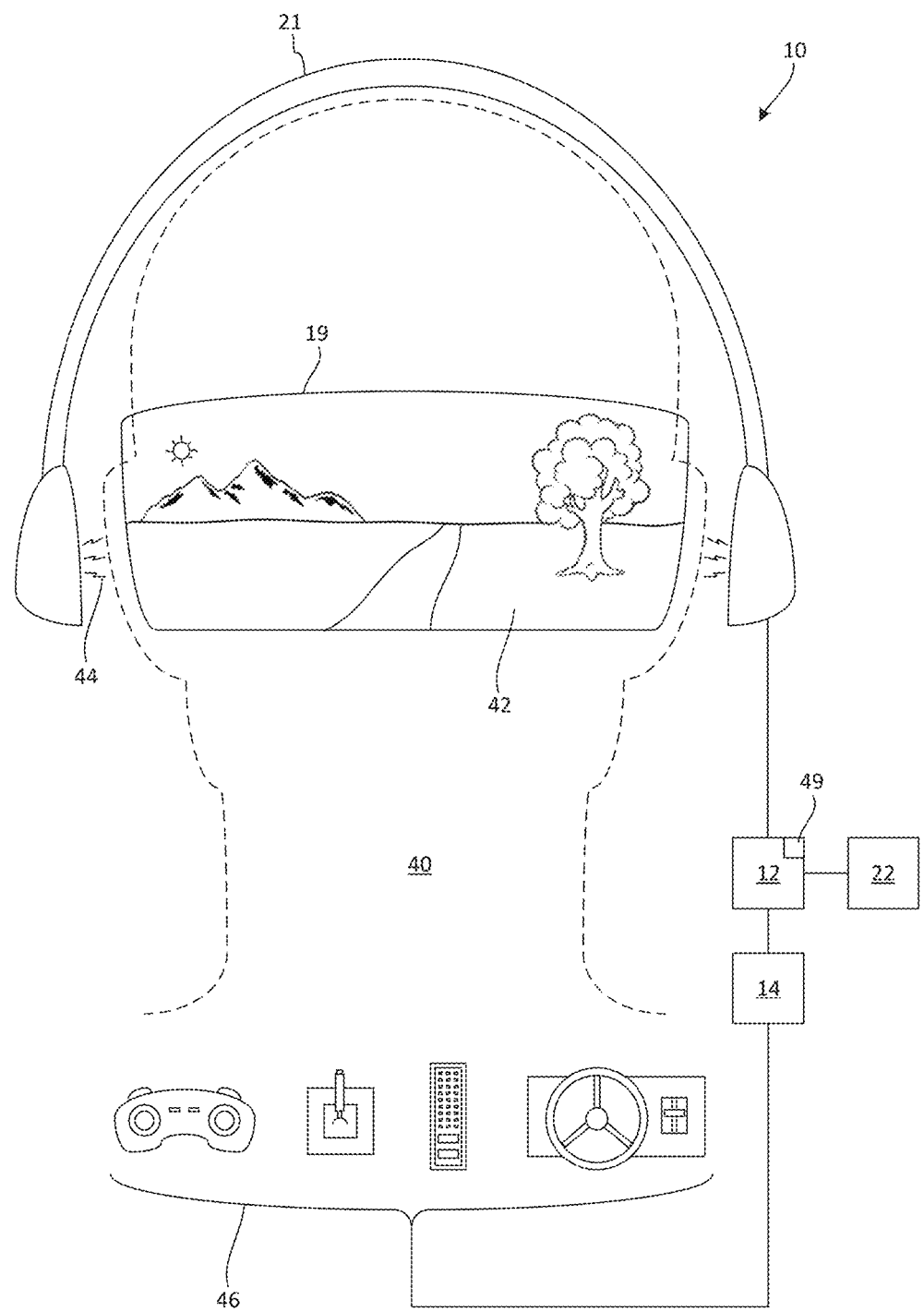
FIG. 2a is a schematic diagram illustrating the exemplary system shown in FIG. 1 as used by a user during a normal operating condition.

Referring now to FIG. 2a, the display 19 of the VR headset 16 of the system 10 is shown from the point of view of a user 40 wearing the VR headset 16 (i.e., looking through the back of the user's head). The headphones 21 of the VR headset 16 are also depicted as worn by the user 40. The above-described message indicator device 12, A/V signal source 14, and control panel 22 are shown schematically. During normal use of the VR headset 16, the user 40 may be presented with an A/V feed supplied by the A/V signal source 14, the A/V feed including video 42 presented via the display 19 and audio 44 presented via the headphones 21. The system 10 may further include one or more input devices 46 that may be coupled to the A/V signal source 14 for allowing a user to control and/or interact with the A/V feed supplied by the A/V signal source 14 in a manner that will be familiar to those of ordinary skill in the art. Such input devices may include, but are not limited to, game pads, joysticks, remote controls, steering wheels, and the like.

Figure 2B:
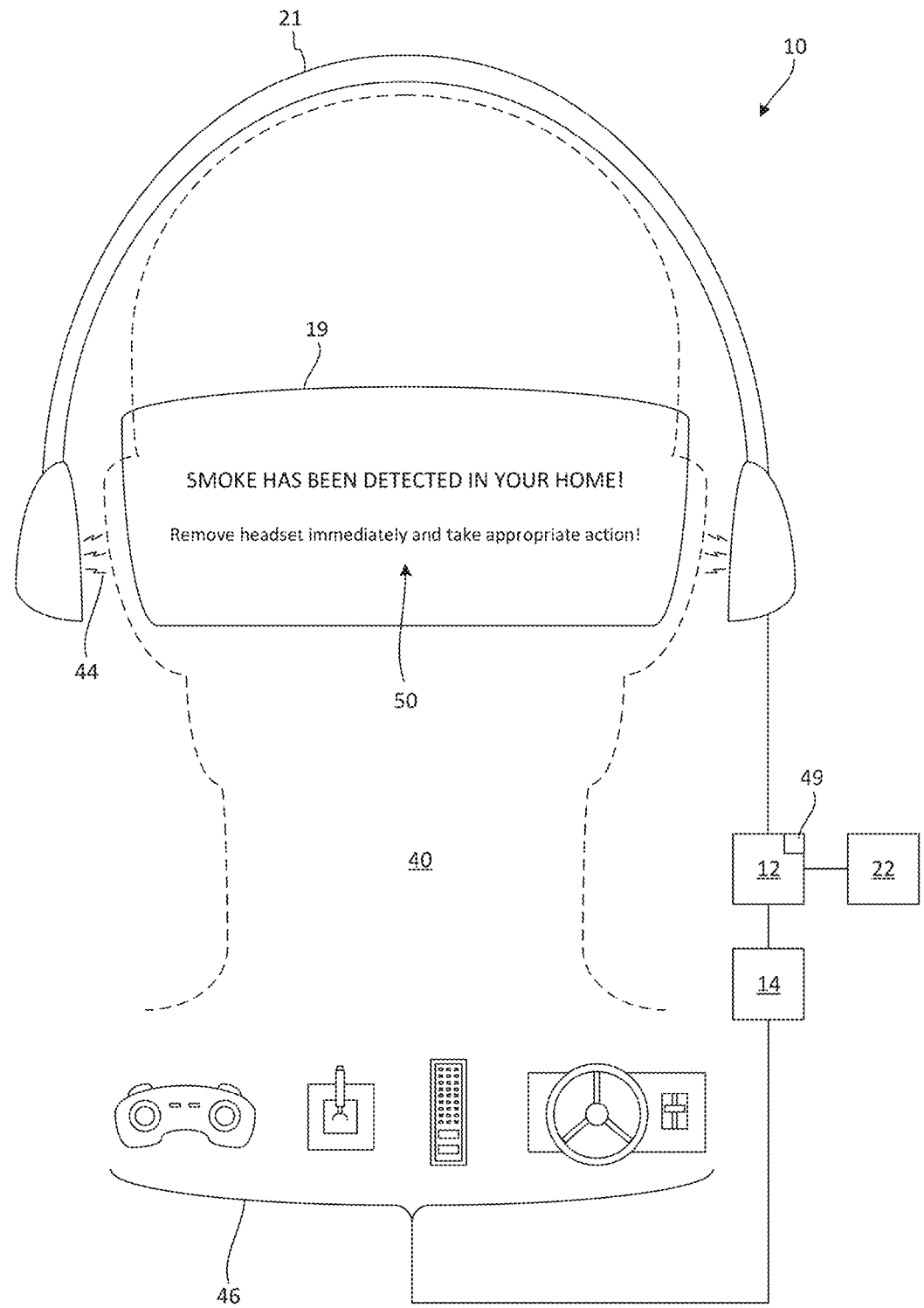
FIG. 2b is a schematic diagram illustrating the exemplary system shown in FIG. 1 as used by a user during a notification event.

In a first embodiment of the system 10, the message indicator device 12 may be configured such that, upon receiving a notification signal from the control panel 22 or zone type inputs 39 indicating the occurrence of a notification event (e.g., the detection of smoke), the processor 13 of the message indicator device 12 replaces the A/V feed provided by A/V signal source 14 with an alert signal that is intended to notify the user 40 of the notification event. That is, instead of acting as a simple path-through for the A/V feed as described above, the message indicator device 12 may actively block or interrupt the A/V feed and may instead transmit an alert signal to the VR headset 16. The alert signal may contain one of a plurality of alert messages that may be stored in a memory 49 of the message indicator device 12 and that is selected based on information contained in the notification signal received from the control panel 22. For example, referring to FIG. 2b, if the notification signal indicates the detection of smoke by the monitoring system 24 (FIG. 1), the message indicator device 12 may issue an alert signal to the VR headset 16 that presents the user 40 with a corresponding notification 50 informing the user 40 of the detected smoke and instructing the user 40 to remove the VR headset 16 and take appropriate action (e.g., "SMOKE HAS BEEN DETECTED IN YOUR HOME! Remove headset and take appropriate action!"). The notification 50 may include a video message that is presented on the display 19 of the VR headset 16 as shown as shown in FIG. 2b and/or may include an audible message that is played through the headphones 21 of the VR headset 16.

It is contemplated that in some cases the alert signal and the resulting notification 50 may be supplemented with more specific information relating to a detected notification event. For example, if the notification event is a telephone call being received at the residence 26 (FIG. 1), the notification 50 may, in addition to informing the user 40 that a telephone call is being received, present the user with caller identification information relating to the incoming phone call. In another example, if the notification event is the actuation of a doorbell at the residence 26 (FIG. 1), the notification 50 may present the user 40 with a live video feed from a security camera located at the corresponding door of the residence 26 showing an individual who rang the doorbell.

In an alternative embodiment of the system 10, it is contemplated that instead of selecting and issuing an alert signal that communicates a specific notification event to the user 40, the message indicator device 12 may instead issue a generic alert signal that presents the user 40 with a corresponding generic notification 50 via the display 19 and/or the headphones 21 of the VR headset 16 regardless of the particular notification event taking place. For example, the notification 50 may include a message such as "NOTIFICATION EVENT DETECTED. Remove headset." This obviates the need for the message indicator device 12 to correlate a notification signal received from the control panel 22 with a more specific alert signal stored in a memory of the message indicator device 12 as described above.

Figure 3:
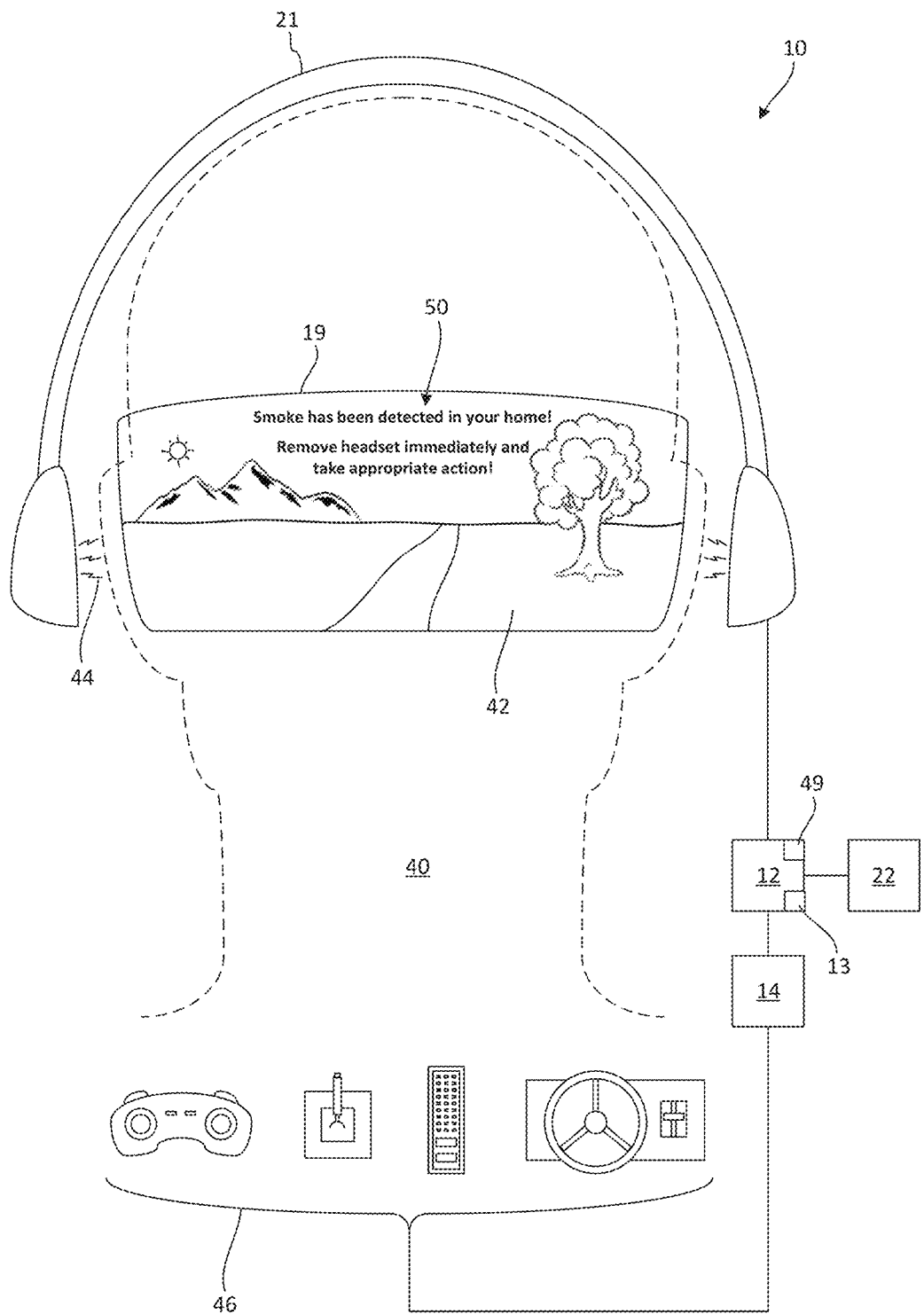
FIG. 3 is a schematic diagram illustrating a variation of the exemplary system shown in FIG. 1 as used by a user during a notification event.

In another embodiment of the system 10 illustrated in FIG. 3, it is contemplated that the message indicator device 12 may be configured such that, instead of interrupting the A/V feed provided by A/V signal source 14 and substituting an alert signal as described above, the processor 13 of the message indicator device 12 supplements the A/V feed provided by A/V signal source 14 with an alert signal so that the A/V feed is overlaid with a notification 50 as depicted. For example, the processor 13 (or a separate processor) of the message indicator device 12 may be configured to process the A/V feed supplied by the A/V signal source 14 in order to overlay the notification 50 thereon, wherein the notification 50 may include a video message that is presented on the display 19 of the VR headset 16 over the video 42 of the A/V feed (as depicted) and/or an audible message that is played through the headphones 21 of the VR headset 16 over the audio 44 of the A/V feed. Thus, the notification 50 may be presented to the user 40 in a substantially seamless fashion, and the immersive experience provided by the VR headset 16 may continue in a substantially uninterrupted manner until the user 40 decides to remove and/or deactivate the VR headset 16.

Further embodiments of the system 10 are contemplated that incorporate a hybrid of the above-described interruptive and overlaid notification schemes in a situation-dependent manner. For example, the message indicator device 12 may be configured such that if a detected notification event is determined to be hazardous or life-threatening (e.g., detection of smoke, heat, carbon monoxide, intrusion, etc.), the message indicator device 12 may completely replace the A/V feed provided by A/V signal source 14 with an alert signal as depicted in FIG. 2a. However, if a detected notification event is non-hazardous or non-life-threating, the message indicator device 12 may instead supplement the A/V feed provided by A/V signal source 14 with an alert signal so that the A/V feed is overlaid with a notification 50 as shown in FIG. 3. Thus, the system 10 may present notifications to the user 40 in a manner that emphasizes the importance and danger associated with hazardous notification events, and may also allow the user 40 to enjoy his or her use of the VR headset 16 in a substantially uninterrupted manner while receiving convenient notifications of non-hazardous notification events.

Figure 4:
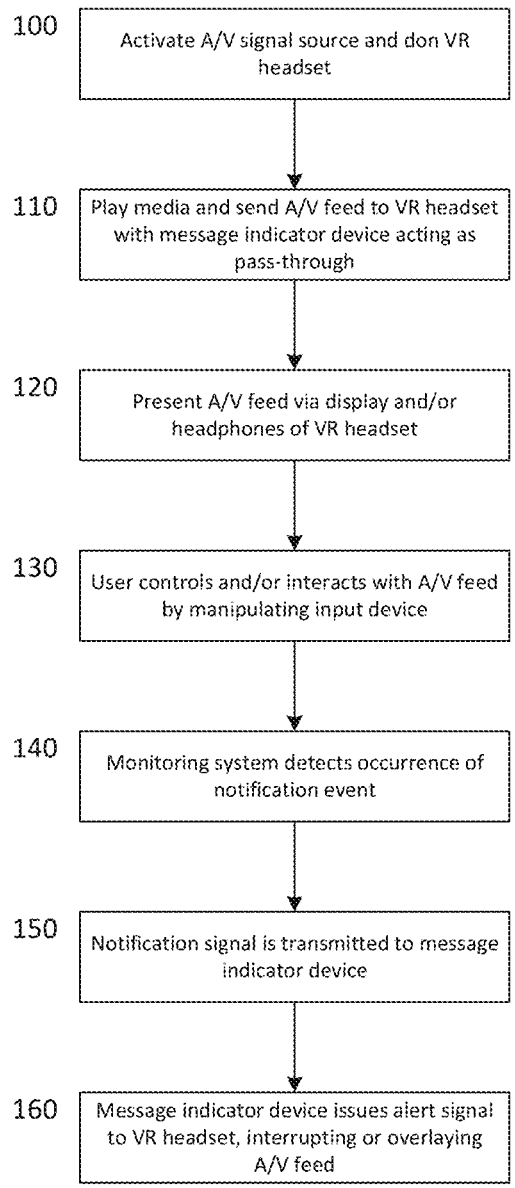
FIG. 4 is a flow diagram illustrating an exemplary embodiment of a notification method in accordance with the present disclosure.

Referring to FIG. 4, a flow diagram illustrating an exemplary method for providing a user of a VR headset with notifications relating to events occurring in the user's real-world environment in accordance with the present disclosure is shown. The method will now be described in detail in conjunction with the schematic representations of the system 10 shown in FIGS. 1a-3.

At block 100 of the exemplary method, the user 40 may activate the A/V signal source 14 and may don the display 19 and the headphones 21 of the VR headset 16. At block 110 of the method, the A/V signal source 14 may play media (e.g., video media, audio media, a video game, etc.) selected by the user 40 and may send an A/V feed to the VR headset 16 via the message indicator device 12, with the message indicator device 12 acting as a simple pass-through for the A/V feed as described above. At block 120 of the method, the user 40 may be presented with the A/V feed supplied by the A/V signal source 14 including video 42 presented to the user 40 via the display 19 and/or audio 44 presented to the user 40 via the headphones 21. At block 130 of the method, the user 40 may manipulate the one or more input devices 46 that may be coupled to the A/V signal source 14 for allowing the user 40 to control and/or interact with the A/V feed supplied by the A/V signal source 14 (e.g., to control playback of a video, to play a video game, etc.).

At block 140 of the exemplary method, the control panel 22 of the monitoring system 24 may detect the occurrence of a notification event (e.g., the presence of smoke, intrusion via the opening/breaking of a door or window, an incoming telephone call, ringing of a doorbell, etc.) or one of the zone type inputs 39 may be actuated upon the occurrence of a notification event At block 150 of the method, the message indicator device 12 may receive a notification signal indicating the detected notification event. Upon receiving the notification signal, the processor 13 of the message indicator device 12 may, at block 160 of the method, replace the A/V feed provided by A/V signal source 14 with an alert signal that is intended to notify the user 40 of the notification event. Particularly, the message indicator device 12 may actively block or interrupt the A/V feed supplied by the A/V signal source 14 and may instead transmit an alert signal to the VR headset 16. The alert signal may cause the VR headset 16 to present the user 40 with a notification 50 via the display 19 and/or the headphones 21 informing the user 40 of the detected notification event and instructing the user 40 to remove the VR headset 16 and take appropriate action. The notification 50 may inform the user 40 of the specific notification event that has been detected, or may be a generic message informing the user 40 that a notification event has occurred.

In an alternative embodiment of block 160 of the exemplary method, the message indicator device 12 may, instead of interrupting the A/V feed provided by A/V signal source 14 and substituting an alert signal as described above, supplement the A/V feed provided by A/V signal source 14 with an alert signal so that the A/V feed is overlaid with a notification 50 as depicted in FIG. 3. For example, the processor 13 of the message indicator device 12 may process the A/V feed supplied by the A/V signal source 14 and may overlay the notification 50 thereon, wherein the notification 50 may include a video message that is presented on the display 19 of the VR headset 16 over the video 42 of the A/V feed and/or an audible message that is played through the headphones 21 of the VR headset 16 over the audio 44 of the A/V feed.

In yet alternative embodiment of block 160 of the exemplary method, a hybrid of the above-described interruptive and overlaid notification schemes may be implemented in a situation-dependent manner. For example, if a detected notification event is determined to be hazardous or life-threatening (e.g., detection of smoke, carbon monoxide, intrusion, etc.), the message indicator device 12 may completely replace the A/V feed provided by A/V signal source 14 with an alert signal as depicted in FIG. 2a. However, if a detected notification event is non-hazardous or non-life-threating, the message indicator device 12 may instead supplement the A/V feed provided by A/V signal source 14 with an alert signal so that the A/V feed is overlaid with a notification 50 as shown in FIG. 3.

Thus, it will be appreciated that above-described system and method allow an occupant of a premises to conveniently receive notifications relating to events occurring within the occupant's real-world environment while the occupant is using a VR headset.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The various embodiments or components described above may be implemented as part of one or more computer systems. Such a computer system may include a computer, an input device, a display unit and an interface, for example, for accessing the Internet. The computer may include a microprocessor. The microprocessor may be connected to a communication bus. The computer may also include memories. The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISCs), application specific integrated circuits (ASICs), logic circuits, and any other circuit or processor capable of executing the functions described herein. The above examples are exemplary only, and are thus not intended to limit in any way the definition and/or meaning of the term "computer."

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the term "software" includes any computer program stored in memory for execution by a computer, such memory including RAM memory, ROM memory, EPROM memory, EEPROM memory, and non-volatile RAM (NVRAM) memory. The above memory types are exemplary only, and are thus not limiting as to the types of memory usable for storage of a computer program.

The invention claimed is:

1. A message indicator device comprising a processor configured to:
communicate an audiovisual (A/V) feed from an A/V signal source to a virtual reality (VR) headset during a normal operating state,
communicate an alert signal to the VR headset upon receiving a notification signal from a monitoring system indicating an occurrence of a notification event at a monitored premises;
determine whether the notification signal indicates a hazardous notification event or a non-hazardous notification event; and
if the notification signal indicates a hazardous notification event, the processor to interrupt communication of the A/V feed to the VR headset and replace the A/V feed with the alert signal such that the VR headset presents a notification of the hazardous notification event instead of the A/V feed, and
if the notification signal indicates a non-hazardous notification event, the processor to overlay the alert signal on the A/V feed such that the VR headset presents a notification of the non-hazardous notification event along with the A/V feed.

2. The message indicator device of claim 1, wherein the notification event includes at least one of the presence of smoke, the presence of heat, the activation of a panic alarm, the activation of a medical alarm, the presence of carbon monoxide, the presence of an intruder, the breaking of glass, a doorbell being actuated, a door being opened, a window being opened, and a phone call being received.

3. The message indicator device of claim 1, wherein the processor is configured to to replace the A/V feed with the alert signal such that the VR headset presents a previously stored notification message associated with the hazardous notification event instead of the A/V feed.

4. The message indicator device of claim 1, wherein the processor is configured to overlay the alert signal on the A/V feed such that the VR headset presents a previously stored notification message associated with the non-hazardous notification event along with the A/V feed.

5. The message indicator device of claim 1, further comprising a universal zone type input for facilitating connection to a peripheral input device.

6. The message indicator device of claim 1, wherein the alert signal includes information that is specific to the notification event.

7. The message indicator device of claim 1, wherein the message indicator device is configured to be connected to a control panel of the monitoring system via at least one of a wired connection and a wireless connection.

8. A notification system comprising:
a message indicator device;
an audiovisual (A/V) signal source connected to the message indicator device and adapted provide an A/V feed containing at least one of video information and audio information;
a monitoring system connected to the message indicator device and configured to detect notification events at a monitored premises; and
a virtual reality (VR) headset connected to the message indicator device and adapted to receive and present the A/V feed;
wherein the message indicator device is adapted to
communicate the A/V feed to the VR headset during a normal operating state,
communicate an alert signal to the VR headset upon detection of a notification event by the monitoring system,
determine whether the notification event indicates a hazardous notification event or a non-hazardous notification event, and
if the notification event is a hazardous notification event, interrupt communication of the A/V feed to the VR headset and replace the A/V feed with the alert signal such that the VR headset presents a notification of the hazardous notification event instead of the A/V feed, and
if the notification event is a non-hazardous notification event, overlay the alert signal on the A/V feed such that the VR headset presents a notification of the non-hazardous notification event along with the A/V feed.

9. The notification system of claim 8, wherein the message indicator device is configured to replace the A/V feed with the alert signal such that the VR headset presents a previously stored notification message associated with the hazardous notification event instead of the A/V feed.

10. The notification system of claim 8, wherein the message indicator device includes a processor that is adapted to overlay the alert signal on the A/V feed such that the VR headset presents a previously stored notification message associated with the non-hazardous notification event along with the A/V feed.

11. A notification method comprising:
an audiovisual (A/V) signal source sending an A/V feed containing at least one of video information and audio information to a virtual reality (VR) headset via a message indicator device that is connected to the A/V signal source and to the VR headset;
the VR headset presenting the A/V feed to a user via at least one of a display and headphones of the VR headset;
the message indicator device:
receiving a notification signal indicating the occurrence of a notification event at a monitored premises from a monitoring system;

determining whether the received notification signal indicates a hazardous notification event or a non-hazardous notification event; and upon determining the notification event is a hazardous notification event, the message indicator device interrupting communication of the A/V feed to the VR headset and replace the A/V feed with the alert signal such that the VR headset presents a notification of the hazardous notification event instead of the A/V feed, and upon determining the notification event is a non-hazardous notification event, the message indicator device overlaying the alert signal on the A/V feed such that the VR headset presents a notification of the non-hazardous notification event along with the A/V feed.

12. The notification method of claim 11, wherein the notification event includes at least one the presence of smoke, the presence of heat, the activation of a panic alarm, the activation of a medical alarm, the presence of carbon monoxide, the presence of an intruder, the breaking of glass, a doorbell being actuated, a door being opened, a window being opened, and a phone call being received.

13. The notification method of claim 11, further comprising the message indicator device replacing the A/V feed with the alert signal such that the VR headset presents a previously stored notification message associated with the hazardous notification event instead of the A/V feed.

14. The notification method of claim 11, further comprising the message indicator device overlaying the alert signal on the A/V feed such that the VR headset presents a previously stored notification message associated with the non-hazardous notification event along with the A/V feed.

15. The notification method of claim 11, wherein the alert signal includes information that is specific to the notification event.

16. The notification method of claim 11, wherein the monitoring system is a life safety system that includes a plurality of sensors disposed in the premises.

17. The notification method of claim 11, wherein the notification is presented via the display of the VR headset.

18. The notification method of claim 11, wherein the notification is presented via the headphones of the VR headset.

* * * * *